United States Patent
Easwar

(10) Patent No.: US 7,092,965 B2
(45) Date of Patent: Aug. 15, 2006

(54) SYSTEM AND METHOD FOR IMPROVED COMPRESSION OF DCT COMPRESSED IMAGES

(75) Inventor: Venkat Easwar, Cupertino, CA (US)

(73) Assignee: LightSurf Technologies, Inc., Santa Cruz, CA (US)

( * ) Notice: Subject to any disclaimer, the term of this patent is extended or adjusted under 35 U.S.C. 154(b) by 363 days.

(21) Appl. No.: 10/192,181

(22) Filed: Jul. 9, 2002

(65) Prior Publication Data

US 2004/0008897 A1    Jan. 15, 2004

(51) Int. Cl.
*G06F 17/30* (2006.01)

(52) U.S. Cl. .................... 707/104.1; 382/232

(58) Field of Classification Search .......... 707/1–10, 707/100–104.1, 200–206; 382/232, 236, 382/240, 166; 704/203; 709/247
See application file for complete search history.

(56) References Cited

U.S. PATENT DOCUMENTS

| | | | |
|---|---|---|---|
| 5,617,142 A * | 4/1997 | Hamilton | 375/240.03 |
| 6,385,656 B1 * | 5/2002 | Appelman | 709/247 |
| 6,526,174 B1 * | 2/2003 | Graffagnino | 382/236 |
| 6,574,629 B1 * | 6/2003 | Cooke, Jr. et al. | 707/10 |
| 6,697,521 B1 * | 2/2004 | Islam et al. | 382/240 |
| 6,711,299 B1 * | 3/2004 | Chao et al. | 382/240 |
| 6,757,648 B1 * | 6/2004 | Chen et al. | 704/203 |
| 6,771,828 B1 * | 8/2004 | Malvar | 382/240 |
| 6,782,133 B1 * | 8/2004 | Yokose et al. | 382/232 |
| 6,782,395 B1 * | 8/2004 | Labelle | 707/104.1 |
| 6,813,384 B1 * | 11/2004 | Acharya et al. | 382/232 |

* cited by examiner

*Primary Examiner*—Jeffrey Gaffin
*Assistant Examiner*—Yicun Wu
(74) *Attorney, Agent, or Firm*—Blakeley, Sokoloff, Taylor & Zafman LLP; Judith A. Szepesi

(57) ABSTRACT

A system providing methods for improved compression of images that have been compressed using Discrete Cosine Transform (DCT) based compression is described. A digital image that has been compressed using DCT based compression, such as an image compressed using the Joint Photographic Experts Group (JPEG) compression scheme, is received and partially decompressed to generate DCT coefficients of the image. The decoded coefficients of the image are then rearranged to aggregate like frequencies together. After rearrangement, the image is recompressed using a wavelet-based compression scheme.

39 Claims, 10 Drawing Sheets

SYSTEM AND METHOD FOR IMPROVED COMPRESSION OF DCT COMPRESSED IMAGES

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to digital image processing and, more particularly, to improved techniques for compression of digital images.

2. Description of the Background Art

Today, digital imaging, particularly in the form of digital cameras, is a prevalent reality that affords a new way to capture photos using a solid-state image sensor instead of traditional film. A digital camera functions by recording incoming light on some sort of sensing mechanism and then processes that information (basically, through analog-to-digital conversion) to create a memory image of the target picture. A digital camera's biggest advantage is that it creates images digitally thus making it easy to transfer images between all kinds of devices and applications. For instance, one can easily insert digital images into word processing documents, send them by e-mail to friends, or post them on a Web site where anyone in the world can see them. Additionally, one can use photo-editing software to manipulate digital images to improve or alter them. For example, one can crop them, remove red-eye, change colors or contrast, and even add and delete elements. Digital cameras also provide immediate access to one's images, thus avoiding the hassle and delay of film processing. All told, digital photography is becoming increasingly popular because of the flexibility it gives the user when he or she wants to use or distribute an image.

The defining difference between digital cameras and those of the film variety is the medium used to record the image. While a conventional camera uses film, digital cameras use an array of digital image sensors. When the shutter opens, rather than exposing film, the digital camera collects light on an image sensor, a solid-state electronic device. The image sensor contains a grid of tiny photosites that convert light shining on them to electrical charges. The image sensor may be of the charged-coupled device (CCD) or complementary metal-oxide semiconductor (CMOS) variety. During camera operation, an image is focused through the camera lens so that it will fall on the image sensor. Depending on a given image, varying amounts of light hit each photosite, resulting in varying amounts of electrical charge at the photosites. These charges can then be measured and converted into digital information that indicates how much light hit each site which, in turn, can be used to recreate the image. When the exposure is completed, the sensor is much like a checkerboard, with different numbers of checkers (electrons) piled on each square (photosite). When the image is read off of the sensor, the stored electrons are converted to a series of analog charges which are then converted to digital values by an Analog-to-Digital (A-to-D) converter, which indicates how much light hit each site which, in turn, can be used to recreate the image.

In order to generate an image of quality that is roughly comparable to a conventional photograph, a substantial amount of information must be captured and processed. For example, a low-resolution 640×480 image has 307,200 pixels. If each pixel uses 24 bits (3 bytes) for true color, a single image takes up about a megabyte of storage space. As the resolution increases, so does the image's file size. At a resolution of 1024×768, each 24-bit picture takes up 2.5 megabytes of storage space. Because of the large size of this information, digital cameras usually do not store a picture in its raw digital format but, instead, apply compression techniques, such as JPEG (Joint Photographic Experts Group) compression, to the image so that it can be stored in a standard-compressed image format (e.g., JPEG File Interchange Format). Compressing images allows the user to save more images on the camera's "digital film," such as flash memory (available in a variety of specific formats) or other facsimile of film. It also allows the user to download and display those images more quickly.

During compression, data that is duplicated or which has little value is eliminated or saved in a shorter form, greatly reducing a file's size. When the image is then edited or displayed, the compression process is reversed. In digital photography, two forms of compression are used: lossless and lossy. In lossless compression (also called reversible compression), reversing the compression process produces an image having a quality that matches the original source. Although lossless compression sounds ideal, it does not provide much compression. Generally, compressed files are still a third the size of the original file, not small enough to make much difference in most situations. For this reason, lossless compression is used mainly where detail is extremely important as in x-rays and satellite imagery. A leading lossless compression scheme is LZW (Lempel-Ziv-Welch). This is used in GIF and TIFF files and achieves compression ratios of 50 to 90%.

Although it is possible to compress images without losing some quality, it is not practical in many cases. Therefore, all popular digital cameras use a lossy compression scheme. Although lossy compression does not uncompress images to the same quality as the original source, the image remains visually lossless and appears normal. In many situations, such as posting images on the Web, the image degradation is not obvious. The trick is to remove data that is not obvious to the viewer. For example, if large areas of the sky are the same shade of blue, only the value for one pixel needs to be saved along with the locations of where the other identical pixels appear in the image.

Currently, the leading lossy compression scheme is JPEG (Joint Photographic Experts Group) used in JFIF files (JPEG File Interchange Format). For purposes of this document, JPEG compression is used as an example of a DCT based compression scheme. Today, JPEG is the most widely used scheme for compression of digital images in digital cameras. JPEG is a lossy compression algorithm that works by converting the spatial image representation into a frequency map. The scheme typically allows the user to select the degree of compression, with compression ratios between 10:1 and 40:1 being common. Because lossy compression affects the image, most cameras allow the user to choose between different levels of compression. This allows the user to choose between lower compression and higher image quality or greater compression and poorer image quality.

Although the JPEG scheme is widely used and does enable considerable reduction of the size of an image file, it has some drawbacks. One problem with JPEG is that it operates on 8×8 pixel blocks rather than the entire image. This may result in visible "block" artifacts (wherein the boundaries of the 8×8 pixel blocks become visible when the image is decompressed), especially at high compression ratios. To avoid block artifacts, JPEG is typically used at lower compression ratios, which results in larger image files. This means that fewer images may be stored on a digital camera and/or that greater memory resources must be available on the camera.

Relatively large files may also present problems in other applications. For example, large files may be problematic when image information is being transferred wirelessly from a digital camera to another device. In fact, wireless transfer of a digital image may be effectively precluded if the image file is too large because of current bandwidth constraints of most wireless networks. In the emerging market of "wireless imaging," small file sizes are important to transmit pictures over limited bandwidth public cellular networks (e.g., for storing to a repository or for peer-to-peer sharing). Another example of a need for smaller image file sizes is the print graphics industry. In this industry there is a need for smaller file sizes to enable high-resolution pictures to be shared using modems over ordinary phone lines.

Recently it has been discovered that other compression methods (e.g., wavelet-based compression methods) have been found to offer compression performance that is superior to JPEG. Wavelet-based compression operates on the entire image while JPEG operates on 8×8 pixel blocks. The use of "global" information about an image allows wavelet-based compression to avoid the block artifact problems of JPEG, especially at high compression ratios. For example, the new JPEG2000 standard utilizes a wavelet-based compression method. See e.g., "JPEG 2000 image coding system—Part 1: Core coding system," recently approved by the International Organization for Standardization as ISO/IEC 15444-1:2000. For purposes of this document, "JPEG2000" refers to this recently approved image coding system utilizing wavelet-based compression and not the prior JPEG standard.

Despite the above limitations of JPEG and the advances offered by wavelet-based compression methods, JPEG continues to be used in digital cameras as the hardware and software systems for JPEG based compression are readily available from a number of vendors. Given that many digital camera manufacturers have already made considerable investments in developing camera components to support JPEG compression, they are reluctant to abandon this investment in order to implement wavelet-based compression. For example, a number of manufacturers have developed custom hardware modules (e.g., Application Specific Integrated Circuits or ASICs) including functionality for JPEG compression. Another reason for continuing use of JPEG by camera manufacturers is the fact that JPEG is supported in almost all applications for image editing, enhancement, and display.

Given the widespread use of JPEG and other DCT based compression schemes, there is considerable interest in a method that will enable improved compression of DCT compressed images (e.g., JPEG images) thereby enabling such images to be more efficiently stored or transmitted. In particular, a method enabling more efficient compression of digital images would be particularly useful for transmission of digital images over limited bandwidth channels, such as wireless channels. Ideally, this improved compression method will also maintain or even improve upon image quality by reducing the impact of block artifacts inherent with the use of JPEG. The present invention fulfills these and other needs.

GLOSSARY

The following definitions are offered for purposes of illustration, not limitation, in order to assist with understanding the discussion that follows.

CCD: Short for Charge-Coupled Device, an instrument whose semiconductors are connected so that the output of one serves as the input of the next. Until recent years, CCDs were the only image sensors used in digital cameras. Each CCD consists of hundreds of thousands of cells known as photosites or photodiodes. A CCD gets its name from the way the charges on its photosites (pixels) are read after an exposure. After the exposure the charges on the first row are transferred to a place on the sensor called the read out register. From there, the signals are fed to an amplifier and then on to an analog-to-digital converter. Once the row has been read, its charges on the readout register row are deleted, the next row enters, and all of the rows above march down one row. The charges on each row are "coupled" to those on the row above so when one moves down, the next moves down to fill its old space.

CMOS: An abbreviation of Complementary Metal Oxide Semiconductor, a widely used type of semiconductor. CMOS image sensors, like CCD image sensors, capture light on a grid of small photosites on their surfaces, however they process images differently than CCDs and are manufactured using different techniques. CMOS chips require less power than chips using just one type of transistor. This makes them particularly attractive for use in battery-powered devices, such as portable computers and digital cameras. Another advantage of CMOS semiconductors is that they may be manufactured using established high-yield techniques and, therefore, are significantly less expensive to fabricate than specialist CCDs. Furthermore, while CCDs have the single function of registering where light falls on each of the hundreds of thousands of sampling points, CMOS can be loaded with a host of other tasks, such as analog-to-digital conversion, load signal processing, and handling white balance and camera controls.

DCT: The Discrete Cosine Transform (DCT) is a transformation that separates an image into parts (or spectral sub-bands) of differing importance with respect to the image's visual quality. The DCT is similar to the discrete Fourier transform in that it transforms a signal or image from the spatial domain to the frequency domain. The typical DCT input is an 8 by 8 array of integers containing each pixel's gray scale level; 8-bit pixels have levels from 0 to 255. The output array of DCT coefficients contains integers; these typically range from minus (−) 1024 to 1023. For most images, much of the signal energy lies at low frequencies; these appear in the upper left corner of the DCT. The lower right values represent higher frequencies, and are often small enough to be neglected with little visible distortion.

JPEG: JPEG, which stands for Joint Photographic Experts Group is currently the most widely used scheme for compression of digital images. JPEG is a lossy compression algorithm that works by converting the spatial image representation into a frequency map. For further information on JPEG compression, see e.g., Nelson, M. et al., "The Data Compression Book," Second Edition, Chapter 11: Lossy Graphics Compression (particularly at pp. 326–330), M&T Books, 1996. Also see e.g., "JPEG-like Image Compression (Parts 1 and 2)," Dr. Dobb's Journal, July 1995 and August 1995 respectively (available on CD ROM as "Dr. Dobb's/CD Release 6" from Dr. Dobb's Journal of San Mateo, Calif.). The disclosures of the foregoing are hereby incorporated by reference. In this document, references to "JPEG" refer generally to any image compression method using a Discrete Cosine Transform (DCT). In addition, references to a "JPEG image" or "JPEG image file" shall refer generally to an image compressed using JPEG or another DCT based compression scheme and stored in any file format.

JPEG2000: JPEG2000 is a standard for image compression adopted by the International Organization for Standardization (ISO) which defines a set of lossless (bit-preserving) and lossy compression methods for coding continuous-tone, bi-level, gray-scale, or color digital still images. JPEG2000 utilizes a wavelet-based transformation rather than the Discrete Cosine Transform (DCT) utilized by JPEG. For further information on JPEG2000, see e.g., "JPEG 2000 image coding system—Part 1: Core coding system," available from the ISO as ISO/IEC 15444-1: 2000, the disclosure of which is hereby incorporated by reference. Also see, e.g., M. Adams, "The JPEG-2000 Still Image Compression Standard" (September, 2001), the disclosure of which is hereby incorporated by reference. A copy of this article is currently available via the Internet at http://www.jpeg.org/wg1n2412.pdf. For additional information on JPEG2000 and wavelet-based compression of digital images, also see e.g., Christopoulos, C., Ebrahami, T., and Skodras, A., "JPEG2000: The New Still Picture Compression Standard," in IEEE Signal Processing Magazine (September, 2001), the disclosure of which is hereby incorporated by reference. A copy of this article is currently available via the Internet at www.eecs.harvard.edu/~michaelm/E126/jpegb.pdf.

Huffman coding: Huffman coding involves taking a block of input characters with fixed length and producing a block of output bits of variable length. It is a fixed-to-variable length code that assigns short code words to those input blocks with high probabilities and long code words to those with low probabilities. Huffman coding is described in the patent, technical, and trade press; see, e.g., Nelson, M. et al., "The Data Compression Book," Second Edition, Chapters 4 and 5, M&T Books, 1996, the disclosure of which is hereby incorporated by reference.

Photosites: Photosites or photodiodes are essentially light-collecting wells that convert optical information into an electric charge. When light particles known as photons enter the silicon body of the photosite, they provide enough energy for negatively charged electrons to be released. The more light that enters the photosite, the more free electrons are available. Each photosite has an electrical contact attached to it, and when a voltage is applied to this the silicon below each photosite becomes receptive to the freed electrons and acts as a container for them. Thus, each photosite has a particular charge associated with it—the greater the charge, the brighter the intensity of the associated pixel. The photosites on an image sensor actually respond only to light, not to color. Color is typically added to an image by means of red, green and blue filters placed over each pixel.

Quantization: In the context of digital image compression, quantization is a lossy transformation that involves selecting the most significant information and discarding information that is less significant (in terms of image perception by the human eye). Quantization is one of the steps of the JPEG compression process, where it typically involves dividing cosine transform coefficients resulting from the Discrete Cosine Transform by a particular element or value (e.g., a scaled value from a quantization matrix) and rounding off the resulting numerical values. Default quantization matrices are specified in the JPEG standard and such matrices were designed in accordance with a model of human visual perception. For further information on quantization, see e.g., Christopoulos, et. al, "JPEG2000: The New Still Picture Compression Standard," above.

Run-length encoding: Run-length encoding or RLE, consists of the process of searching for repeated runs of a single symbol in an input stream, and replacing the run of symbols by a single instance of the symbol and a run count. Run-length encoding is described in the patent, technical, and trade press; see, e.g., Zigon, Robert, "Run-Length Encoding," Dr. Dobb's Journal, February 1989 (available on CD ROM as "Dr. Dobb's/CD Release 6" from Dr. Dobb's Journal of San Mateo, Calif.), the disclosure of which is hereby incorporated by reference.

Wavelet-based compression: Wavelet-based compression is an increasingly used technique for digital image compression based upon a set of basis functions which is defined recursively from a set of scaling coefficients and scaling functions. A discrete wavelet transform (DWT) is defined using these scaling functions and can be used to analyze digital images with superior performance than classical short-time Fourier-based techniques, such as the Discrete Cosine Transform (DCT). The basic difference between wavelet-based and Fourier-based techniques is that short-time Fourier-based techniques use a fixed analysis window, while wavelet-based techniques essentially use a short window at high spatial frequency data and a long window at low spatial frequency data. This makes DWT more accurate in analyzing image signals at different spatial frequency, and thus can represent more precisely both smooth and dynamic regions in an image. Wavelet-based compression schemes typically include a forward wavelet transform, followed by quantization, and lossless entropy encoding. For further information on wavelet compression, see e.g., Pigeon, S., "Image Compression with Wavelets," Dr. Dobb's Journal, August 1999, pp. 111–115. The disclosure of the foregoing is hereby incorporated by reference, for all purposes. Also see e.g., Xiong, Z. and Ramchandran, K., "Wavelet Image Compression," Jun. 12, 2000. The disclosure of the foregoing is also hereby incorporated by reference, for all purposes.

SUMMARY OF THE INVENTION

A system is described that provides methods for improved compression of images that have been compressed using Discrete Cosine Transform (DCT) based compression. The methodology of the present invention enables transformation and improved compression of a digital image previously compressed using a DCT based compression scheme, such as the Joint Photographic Experts Group (JPEG) compression scheme. A digital image that has been compressed using DCT based compression, such as a JPEG image stored on a digital camera, is received and partially decompressed. In the currently preferred embodiment, partial decompression includes entropy decoding the image to generate DCT coefficients of the image. The decoded coefficients of the image are then rearranged to aggregate like frequencies together. For example, DCT coefficients of adjoining pixel blocks of the partially decompressed image can be aggregated together in the same group or band to exploit similarities between such DCT coefficients. After rearrangement, the image is recompressed using a wavelet-based compression scheme. In the currently preferred embodiment, a one-dimensional wavelet transformation is applied recursively to the image. The wavelet transformed image is then quantized and entropy coded. The recompressed image may then be transmitted or stored, as desired.

DETAILED DESCRIPTION OF A PREFERRED EMBODIMENT

The following description will focus on the currently preferred embodiment of the present invention, which is implemented in a digital camera. The present invention is not, however, limited to any one particular application or any particular environment. Instead, those skilled in the art will find that the system and methods of the present invention may be advantageously employed on a variety of different devices. Therefore, the description of the exemplary embodiment that follows is for purpose of illustration and not limitation.

I. Digital Camera-based Implementation

A. Basic Components of Digital Camera

Figure 1:
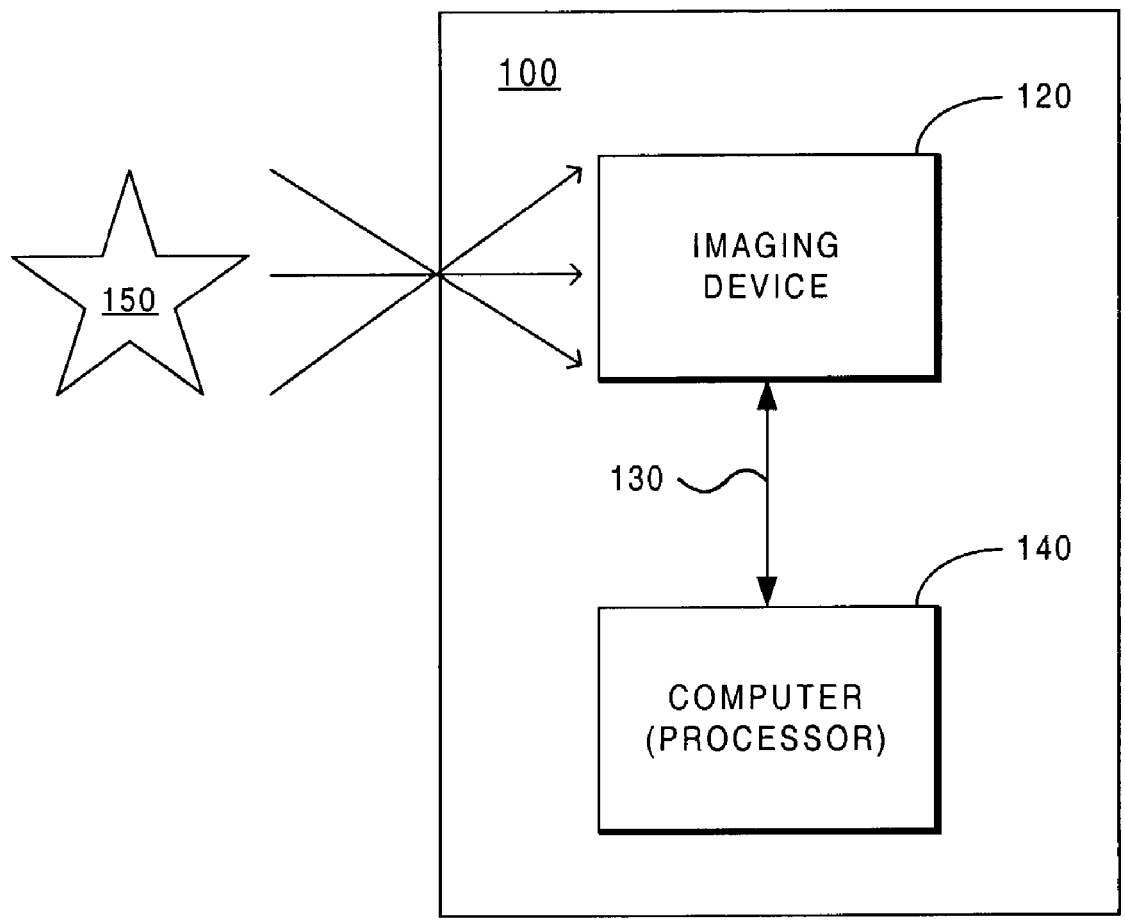
FIG. 1 is a very general block diagram of a digital camera suitable for implementing the present invention.

The present invention may be implemented on a media capturing and recording system, such as a digital camera. FIG. 1 is a very general block diagram of a digital camera 100 suitable for implementing the present invention. As shown, the digital camera 100 comprises an imaging device 120, a system bus 130, and a processor or computer 140 (e.g., microprocessor-based unit). Also shown is a subject or object 150 whose image is to be captured by the digital camera 100. The general operation of these components of the digital camera 100 in capturing an image of the object 150 will now be described.

As shown, the imaging device 120 is optically coupled to the object 150 in the sense that the device may capture an optical image of the object. Optical coupling may include use of optics, for example, such as a lens assembly (not shown) to focus an image of the object 150 on the imaging device 120. The imaging device 120 in turn communicates with the computer 140, for example, via the system bus 130. The computer 140 provides overall control for the imaging device 120. In operation, the computer 140 controls the imaging device 120 by, in effect, telling it what to do and when. For instance, the computer 140 provides general input/output (I/O) control that allows one to coordinate control of the imaging device 120 with other electromechanical peripherals of the digital camera 100 (e.g., flash attachment).

Once a photographer or camera user has aimed the imaging device 120 at the object 150 (with or without user-operated focusing) and, using a capture button or some other means, instructed the camera 100 to capture an image of the object 150, the computer 140 commands the imaging device 120 via the system bus 130 to capture an image representing the object 150. The imaging device 120 operates, in essence, by capturing light reflected from the object 150 and transforming that light into image data. The captured image data is transferred over the system bus 130 to the computer 140 which performs various image processing functions on the image data before storing it in its internal memory. The system bus 130 also passes various status and control signals between the imaging device 120 and the computer 140. The components and operations of the imaging device 120 and the computer 140 will now be described in greater detail.

B. Image Capture on Imaging Device

Figure 2A:
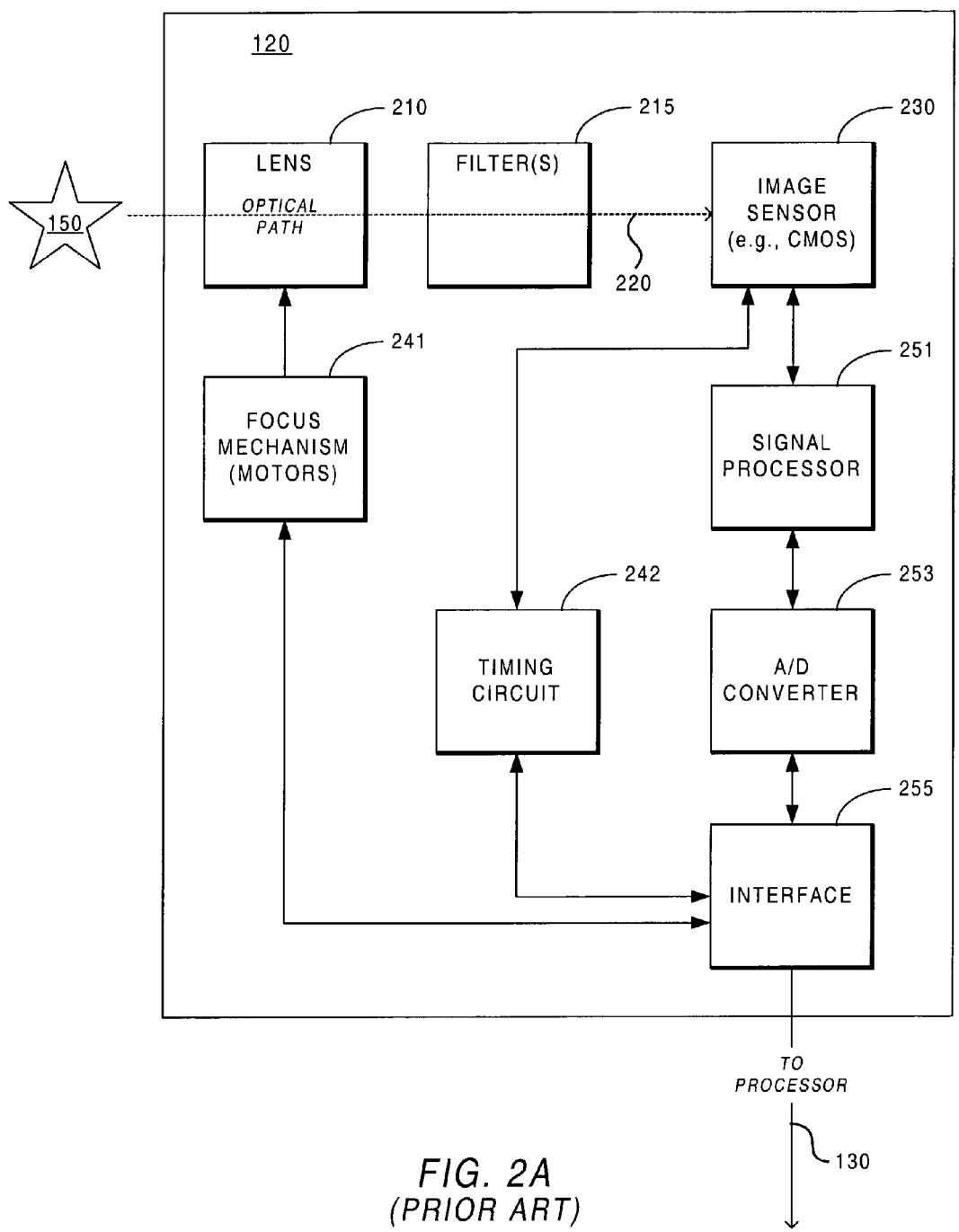
FIG. 2A is a block diagram of a conventional digital imaging device.

FIG. 2A is a block diagram of a conventional digital imaging device 120. As shown, the imaging device 120 comprises a lens 210 having an iris, one or more filter(s) 215, an image sensor 230 (e.g., CMOS, CCD, or the like), a focus mechanism (e.g., motors) 241, a timing circuit 242, a signal processor 251 (e.g., analog signal processor), an analog-to-digital (A/D) converter 253, and an interface 255. The operation of these components will now be described.

In operation, the imaging device 120 captures an image of the object 150 via reflected light impacting the image sensor 230 along optical path 220. The lens 210 includes optics to focus light from the object 150 along optical path 220 onto the image sensor 230. The focus mechanism 241 may be used to adjust the lens 210. The filter(s) 215 preferably include one or more color filters placed over the image sensor 230 to separate out the different color components of the light reflected by the object 150. For instance, the image sensor 230 may be covered by red, green, and blue filters, with such color filters intermingled across the image sensor in patterns ("mosaics") designed to yield sharper images and truer colors.

While a conventional camera exposes film to capture an image, a digital camera collects light on an image sensor (e.g., image sensor 230), a solid-state electronic device. The image sensor 230 may be implemented as either a charged-coupled device (CCD) or a complementary metal-oxide semiconductor (CMOS) sensor. Both CMOS and CCD image sensors operate by capturing light on a grid of small cells known as photosites (or photodiodes) on their surfaces. The surface of an image sensor typically consists of hundreds of thousands of photosites that convert light shining on them to electrical charges. Depending upon a given image, varying amounts of light hit each photosite, resulting in varying amounts of electrical charge at the photosites. These charges can then be measured and converted into digital information. A CCD sensor appropriate for inclusion in a digital camera is available from a number of vendors, including Eastman Kodak of Rochester, N.Y., Philips of The Netherlands, and Sony of Japan. A suitable CMOS sensor is also available from a variety of vendors. Representative vendors include STMicroelectronics (formerly VSLI Vision Ltd.) of The Netherlands, Motorola of Schaumburg, Ill., and Intel of Santa Clara, Calif.

When instructed to capture an image of the object 150, the image sensor 230 responsively generates a set of raw image data (e.g., in CCD format for a CCD implementation) representing the captured object 150. In an embodiment using a CCD sensor, for example, the raw image data that is captured on the image sensor 230 is routed through the signal processor 251, the analog-to-digital (A/D) converter 253, and the interface 255. The interface 255 has outputs for controlling the signal processor 251, the focus mechanism 241, and the timing circuit 242. From the interface 255, the image data passes over the system bus 130 to the computer 140 as previously illustrated at FIG. 1. The operations of the computer 140 in processing this image data will now be described.

C. Image Processing

Figure 2B:
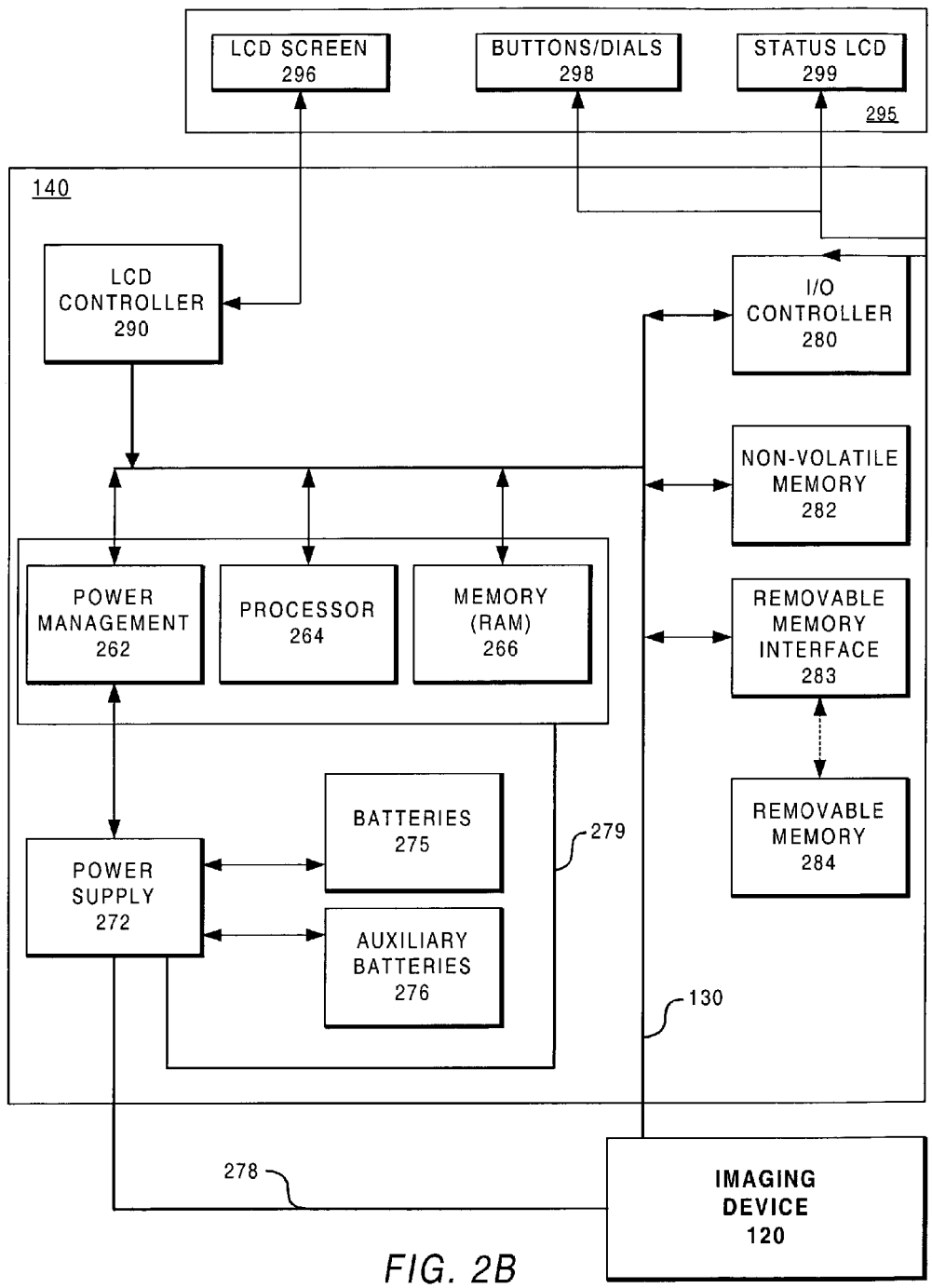
FIG. 2B is a block diagram of a conventional onboard processor or computer provided for directing the operation of the digital camera and processing image data.

A conventional onboard processor or computer 140 is provided for directing the operation of the digital camera 100 and processing image data captured on the imaging device 120. FIG. 2B is a block diagram of the processor or computer 140. As shown, the system bus 130 provides connection paths between the imaging device 120, an (optional) power management 262, a processor (CPU) 264, a random-access memory (RAM) 266, an input/output (I/O) controller 280, a non-volatile memory 282, a removable memory interface 283, and a liquid crystal display (LCD) controller 290. Removable memory 284 connects to the system bus 130 via the removable memory interface 283. Alternately, the camera 100 (and therefore the onboard computer 140) may be implemented without the removable memory 284 or the removable memory interface 283. The power management 262 communicates with the power supply 272. Also illustrated at FIG. 2B is a camera user interface 295 which is electrically connected to the LCD controller 290 and the input/output controller 280. Each of these components will now be described in more detail.

The processor (CPU) 264 typically includes a conventional processor device (e.g., microprocessor) for controlling the operation of camera 100. Implementation of the processor 264 may be accomplished in a variety of different ways. For instance, the processor 264 may be implemented as a microprocessor (e.g., MPC823 microprocessor, available from Motorola of Schaumburg, Ill.) with DSP (digital signal processing) logic blocks, memory control logic blocks, video control logic blocks, and interface logic. Alternatively, the processor 264 may be implemented as a "camera on a chip (set)" using, for instance, a Raptor II chipset (available from Conextant Systems, Inc. of Newport Beach, Calif.), a Sound Vision Clarity 2, 3, or 4 chipset (available from Sound Vision, Inc. of Wayland, Mass.), or similar chipset that integrates a processing core with image processing periphery. Processor 264 is typically capable of concurrently running multiple software routines to control the various processes of camera 100 within a multithreaded environment.

The digital camera 100 includes several memory components. The memory (RAM) 266 is a contiguous block of dynamic memory which may be selectively allocated to various storage functions. Dynamic random-access memory is available from a variety of vendors, including, for instance, Toshiba of Japan, Micron Technology of Boise, Id., Hitachi of Japan, and Samsung Electronics of South Korea. The non-volatile memory 282, which may typically comprise a conventional read-only memory or flash memory, stores a set of computer-readable program instructions to control the operation of the camera 100. The removable memory 284 serves as an additional image data storage area and may include a non-volatile device, readily removable and replaceable by a camera 100 user via the removable memory interface 283. Thus, a user who possesses several removable memories 284 may replace a full removable memory 284 with an empty removable memory 284 to effectively expand the picture-taking capacity of the camera 100. The removable memory 284 is typically implemented using a flash disk. Available vendors for flash memory include, for example, SanDisk Corporation of Sunnyvale, Calif. and Sony of Japan. Those skilled in the art will appreciate that the digital camera 100 may incorporate other memory configurations and designs that readily accommodate the image capture and processing methodology of the present invention.

The digital camera 100 also typically includes several interfaces for communication with a camera user or with other systems and devices. For example, the I/O controller 280 is an interface device allowing communications to and from the computer 140. The I/O controller 280 permits an external host computer (not shown) to connect to and communicate with the computer 140. As shown, the I/O controller 280 also interfaces with a plurality of buttons and/or dials 298, and an optional status LCD 299, which in addition to the LCD screen 296 are the hardware elements of the user interface 295 of the device. The digital camera 100 may include the user interface 295 for providing feedback to, and receiving input from, a camera user, for example. Alternatively, these elements may be provided through a host device (e.g., personal digital assistant) for a media capture device implemented as a client to a host device. For an embodiment that does not need to interact with users, such as a surveillance camera, the foregoing user interface components may not be required. The LCD controller 290 accesses the memory (RAM) 266 and transfers processed image data to the LCD screen 296 for display. Although the user interface 295 includes an LCD screen 296, an optical viewfinder or direct view display may be used in addition to or in lieu of the LCD screen to provide feedback to a camera user. Components of the user interface 295 are available from a variety of vendors. Examples include Sharp, Toshiba, and Citizen Electronics of Japan, Samsung Electronics of South Korea, and Hewlett-Packard of Palo Alto, Calif.

The power management 262 communicates with the power supply 272 and coordinates power management operations for the camera 100. The power supply 272 supplies operating power to the various components of the camera 100. In a typical configuration, power supply 272 provides operating power to a main power bus 278 and also to a secondary power bus 279. The main power bus 278 provides power to the imaging device 120, the I/O controller 280, the non-volatile memory 282, and the removable memory 284. The secondary power bus 279 provides power to the power management 262, the processor 264, and the memory (RAM) 266. The power supply 272 is connected to batteries 275 and also to auxiliary batteries 276. A camera user may also connect the power supply 272 to an external power source, as desired. During normal operation of the power supply 272, the main batteries 275 provide operating power to the power supply 272 which then provides the operating power to the camera 100 via both the main power bus 278 and the secondary power bus 279. During a power failure mode in which the main batteries 275 have failed (e.g., when their output voltage has fallen below a minimum operational voltage level), the auxiliary batteries 276 provide operating power to the power supply 276. In a typical configuration, the power supply 272 provides power from the auxiliary batteries 276 only to the secondary power bus 279 of the camera 100.

The above-described system 100 is presented for purposes of illustrating the basic hardware underlying a media capturing and recording system (e.g., digital camera) that may be employed for implementing the present invention. The present invention, however, is not limited to just digital camera devices but, instead, may be advantageously applied to a variety of devices capable of supporting and/or benefiting from the methodologies of the present invention presented in detail below.

II. Transformation and Improved Compression of JPEG Images

A. Overview

The present invention provides a system implementing a method for transcoding (or partially converting) images compressed using Discrete Cosine Transform (DCT) based compression methods to enable improved compression of such JPEG images using wavelet-based compression. Currently, the leading lossy compression scheme for compression of digital images is JPEG (Joint Photographic Experts Group), which uses a DCT transform. The method of the present invention for transcoding a DCT compressed image (e.g., a JPEG compressed image) does not require complete decoding and then recoding of the image and, therefore, avoids the significant computational overhead that would result from completely decoding and recoding the image. Rather, the present method involves partially decompressing (or decoding) images and recoding them using wavelet-based compression. The method enables better compression (i.e., smaller compressed image file sizes) than can be obtained using JPEG or DCT based compression for an image of comparable quality.

Existing equipment, software, and systems may be used for capturing and storing images (e.g., JPEG images in flash memory), thereby enabling the present invention to be used with such existing systems. The method of the present invention involves reading the stored JPEG image, partially decoding the image, and recoding it into a smaller size image file using wavelet-based compression. The process of partial decoding includes entropy decoding a JPEG image to obtain the quantized DCT coefficients. These quantized DCT coefficients are then used as input for a wavelet-based compression routine which is used to generate a (smaller) recompressed (or recoded) image file. These transcoding steps can be performed on the fly on an imaging device (e.g., a digital camera). The smaller recoded image may then be stored locally or transferred (e.g., sent wirelessly from a digital camera to a remote server computer).

After the recoded image has been stored and/or transferred, the method also enables an image to be recomposed (e.g., recomposed as a JPEG image if desired). The method of the present invention enables a JPEG image to be converted (or compressed) into a smaller image file and later reconverted (or decompressed) back into a JPEG image.

B. System Environment

Figure 3:
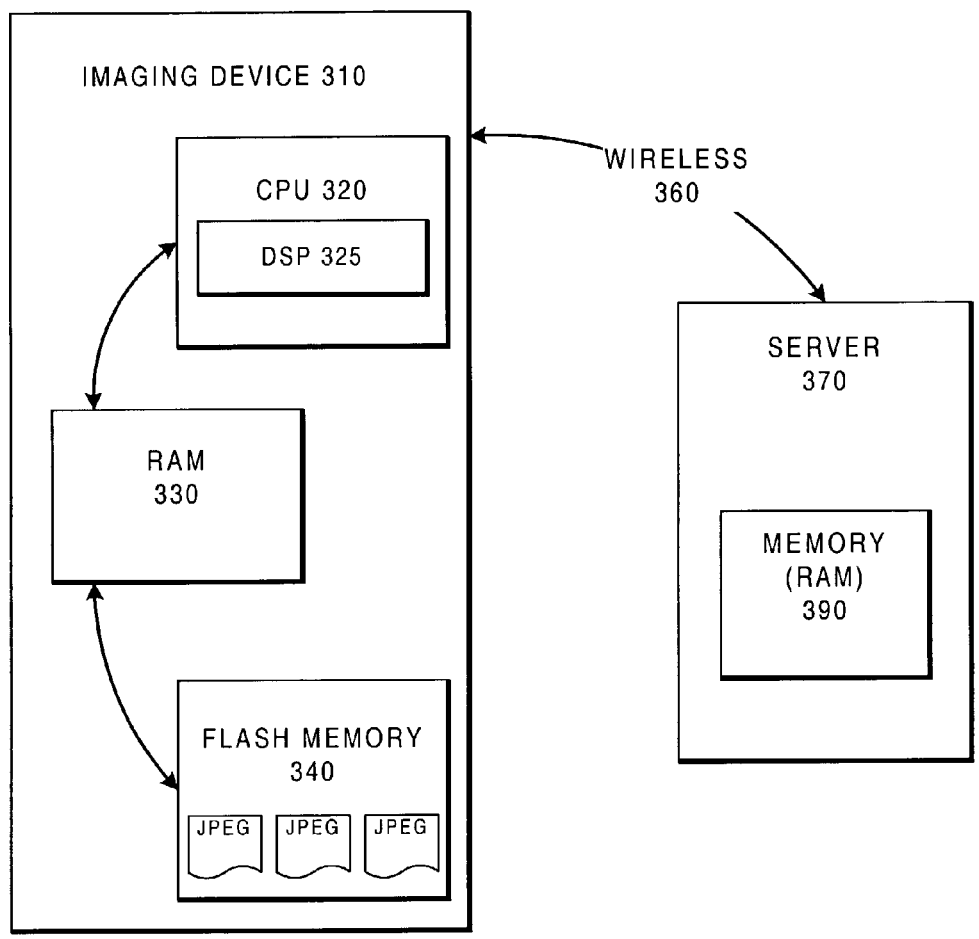
FIG. 3 illustrates an exemplary environment in which the present invention may be embodied.

FIG. 3 illustrates an exemplary environment 300 in which the present invention may be embodied. As shown, environment 300 includes an imaging device 310 (e.g., a digital camera, such as digital camera 100) that includes a central processing unit (CPU) 320 including a dynamic signal processor (DSP) unit 325, a random access memory (RAM) 330 (e.g., DRAM, SRAM, or the like), and a flash memory 340 for storing one or more JPEG compressed images. Focusing on features most relevant to the present invention, basic operation of the image device 310 is as follows. A user operating imaging device 310 may take one or more digital images (pictures), compress such images into JPEG format, and store the JPEG image files in flash memory 340 on the imaging device 310. The transcoding operations of the present invention are handled by DSP unit 325 of CPU 320 which retrieves a JPEG image from flash memory 340 into working memory (i.e., RAM 330) for transcoding and re-compressing the image using wavelet-based compression as hereinafter described in more detail. After transcoding and re-compression, the images may then be sent via wireless network 360 to a server computer 370.

At the server 370, the image data received from the imaging device 310 may be retrieved into memory (RAM) 390 (e.g., DRAM, SRAM, or the like) for decompression (or decoding) back into JPEG format. This process essentially involves the reverse of the transcoding and compression process utilized on the imaging device. The JPEG format image may then be stored or displayed on server 370, or transferred to other devices, as desired. The method of the present invention for transcoding a JPEG image (e.g., on the imaging device 310) will now be described.

C. Transcoding of a JPEG Image to Enable Better Compression

1. Traditional JPEG Compression Process

The method of the present invention provides for transcoding a JPEG image to enable the image to be better compressed using wavelet-based compression. As previously noted, this transcoding process does not involve fully decompressing JPEG image(s). Rather, the method of the present invention provides for these JPEG format images to be partially decompressed (or decoded) and then converted to enable the images to be compressed into a smaller format using wavelet-based compression. In order to explain this transcoding process, the following discussion will first describe the process typically involved in generating a JPEG image. The process for transcoding a JPEG image will then be described.

Figure 4A:
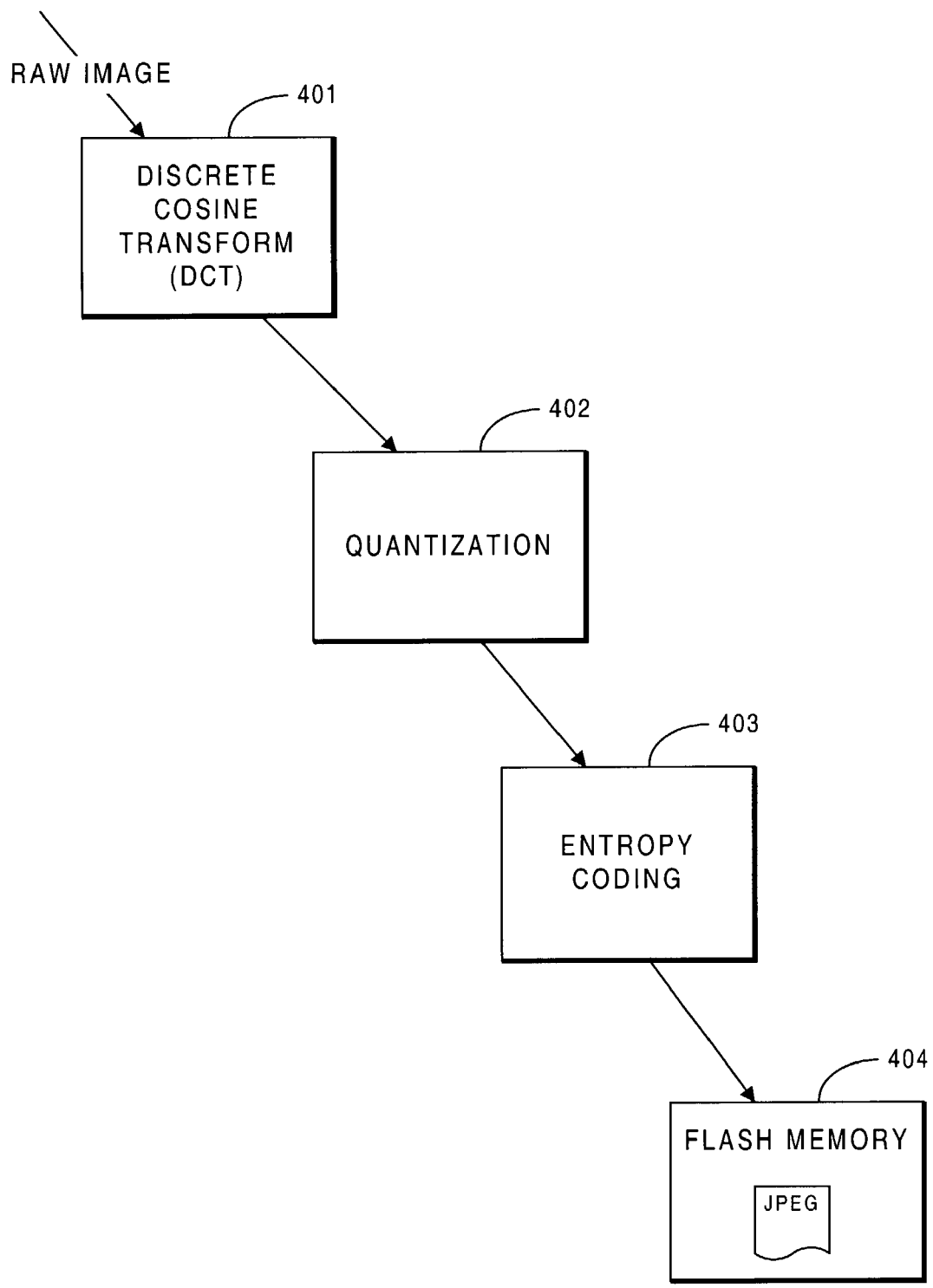
FIG. 4A is a high-level block diagram illustrating the high level operations or processes involved in creating a JPEG image.

FIG. 4A is a high-level block diagram illustrating the high level operations or processes involved in creating a JPEG image. As shown, the process of generating a JPEG image begins with raw image data (e.g., image data captured on a digital camera). As illustrated by block 401, the raw image data is transformed using a Discrete Cosine Transform (DCT), which generates a set of coefficients. As previously described, an image is divided into 8×8 pixel blocks and each block is transformed into an 8×8 block of coefficients. The Discrete Cosine Transform separates the image into parts (or spectral sub-bands) of differing importance to the image's visual quality. The output array of DCT coefficients contains integers. The coefficient at location (0, 0) of a block is called the DC coefficient and the balance of the coefficients are called AC coefficients. For most images, much of the signal information that is important to an image's visual quality lies at low frequencies. Low frequency information typically appears in the upper left corner of the array of DCT coefficients. The lower right values in the array represent higher frequencies which are less important to image quality.

Next, as illustrated by block 402, the 64 coefficients obtained from the DCT transform for each 8×8 pixel block are quantized, typically using a table with 64 entries which enables each coefficient to be adjusted separately. Therefore, the relative significance of the different coefficients can be influenced and certain frequencies can be given more importance than others. Quantization is a lossy transformation that involves selecting the most significant information and discarding information that is less significant (in terms of image perception by the human eye). This involves a tradeoff between image quality and the degree of compression that is desired. A large quantization step size can produce unacceptably large image distortion. Unfortunately, finer quantization leads to lower compression ratios. Because of natural limitations of the human eye in the perception of high frequencies, these higher frequencies play a less important role in image perception. Accordingly, JPEG uses a much higher step size for quantization of higher frequency coefficients than for lower frequency coefficients, with little noticeable image deterioration. For instance, before quantization, the DCT coefficients may comprise 12 bits of data. During quantization of these coefficients, six bits of data may be retained for low frequencies, while only two bits may be retained for high frequencies.

After quantization, an entropy encoding is used, as illustrated by block 403, to reduce the amount of data. Entropy encoding is a lossless encoding as the decompression process regenerates the input data completely (i.e., no information is lost). Typically, a run-length encoding is used to take advantage of the fact that many of the quantized DCT coefficients equal zero. For each non-zero DCT coefficient, JPEG records the number of zeros that preceded the number, the number of bits needed to represent the number's amplitude, and the amplitude itself. To coordinate the runs of zeros, the quantized DCT coefficients are typically rearranged into a one-dimensional array by scanning them in a zig-zag (diagonal) order. The number of previous zeros (i.e., the run length) and the bits needed for the current number's amplitude (i.e., the level or non-zero value immediately following a sequence) form a pair which is referred to as a "run-level pair." The run-level pairs may then be further compressed using other entropy encoding methods. This typically involves using variable length codes in which a variable length coding (e.g., Huffman coding) is used to assign each run-level pair its own code word. A variable length coding usually outputs the code word of the pair, and then the code word for the coefficient's amplitude. After each block, an end-of-block sequence is written to the output stream and the process moves to the next block. When finished with all blocks, the JPEG process writes an end-of-file marker. The compressed data stream is then written to an output file (e.g., a ★jpg file) for storage. This JPEG file may then be stored in flash memory (or another form of persistent storage), as illustrated by block 404 at FIG. 4A.

2. Transcoding of JPEG Images

Figure 4B:
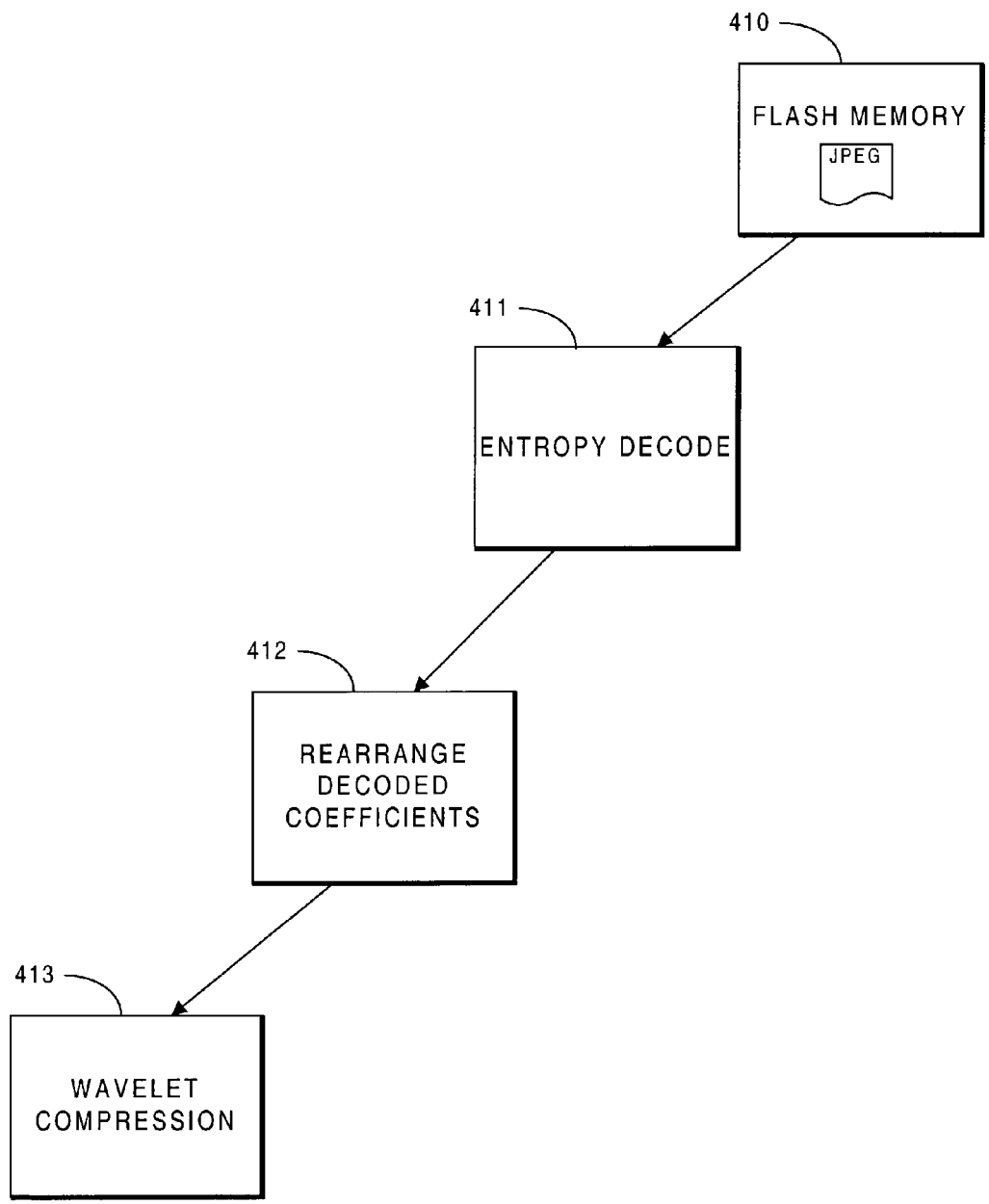
FIG. 4B is a high-level block diagram illustrating the high level operations or processes involved in transcoding a JPEG image in accordance with the present invention.

The user may subsequently wish to further compress the JPEG image using the methodology of the present invention, which may be applied automatically (e.g., without user intervention or knowledge) or manually. For instance, the user may wish to compress the image in order to wirelessly transmit the image to another device (e.g., a remote server computer). FIG. 4B is a high-level block diagram illustrating the high level operations or processes involved in transcoding a JPEG image in accordance with the present invention, which enables improved compression of the image using wavelet-based compression. Although the following discussion uses the transcoding of a single JPEG image as an example, the methods of the present invention may also be used for transcoding and recompressing multiple images. In addition, although JPEG is used as an example to illustrate the operations of the present invention, the present invention may also be advantageously employed with any DCT based compression scheme.

As shown, the process begins with a JPEG image file as illustrated in block 410 at FIG. 4B. It should be noted that JPEG refers to a compression method and not to a specific image file format. Typically JPEG images are stored in a JPEG File Interchange Format (JFIF) file, although other file formats may also be used. In the following discussion, references to a "JPEG image" or "JPEG image file" shall refer generally to an image compressed using a DCT based compression method (e.g., JPEG) and stored in JFIF or any other file format. In this example, the JPEG image file is the same JPEG image file previously stored in flash memory (e.g., as shown in block 404 at FIG. 4A). As illustrated by block 411, the JPEG image file is entropy decoded to obtain the quantized DCT coefficients. As described above, the entropy encoding process is a lossless transformation that does not result in any loss of data. Accordingly, the quantized DCT coefficients that served as input to the entropy encoding process (e.g., input to block 403 at FIG. 4A above) are regenerated by this step of entropy decoding. This typically involves both variable length decoding (e.g., Huffman decoding) as well as run-length decoding. The decoding process generates a stream of these coefficients as described in more detail below.

Next, as illustrated by block 412, these coefficients are rearranged by aggregating like frequencies together. In this process, the entropy-decoded coefficients are analyzed in segments which are referred to as "slices." Each "slice" typically comprises a set of blocks of JPEG image data that are contiguous and correspond to eight lines in the original image. The coefficients contained in various blocks, particularly in contiguous blocks, are often very similar to each other. For example, the DC coefficient is likely to be similar from one block to the next. The highest frequencies in each block are also likely to be similar and, as previously discussed, many of these quantized coefficients may equal zero. However, this is not a characteristic that is exploited by the JPEG compression scheme. The method of the present invention seeks to exploit these similarities to enable better global compression of an image using wavelet-based compression methods. As only a limited number of frequencies are represented by these coefficients, this process of rearranging the quantized coefficients provides an extra dimension of similarities that may then be exploited.

After similar coefficients have been aggregated together, a wavelet-based compression scheme is used for recompression of the image data, as illustrated by block 413. The wavelet-based compression scheme enables the image data to be more efficiently compressed into a smaller format. The recompressed image data may then be more efficiently transmitted (e.g., over a wireless network to a remote server) and/or stored. The methods of the present invention for rearranging the decoded DCT coefficients and recompressing them using a wavelet-based compression scheme will now be described.

D. Rearranging Decoded DCT Coefficients by Aggregating Similar Frequencies

Figure 5A:
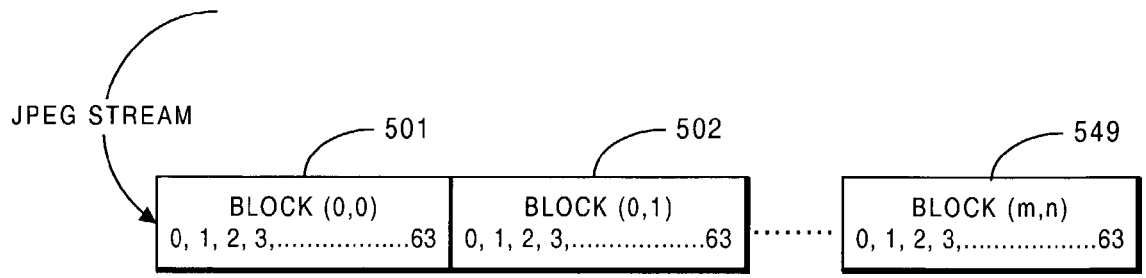
FIG. 5A is an example of the format of the stream of the decoded DCT coefficients resulting from the entropy decoding process.
Figure 5B:
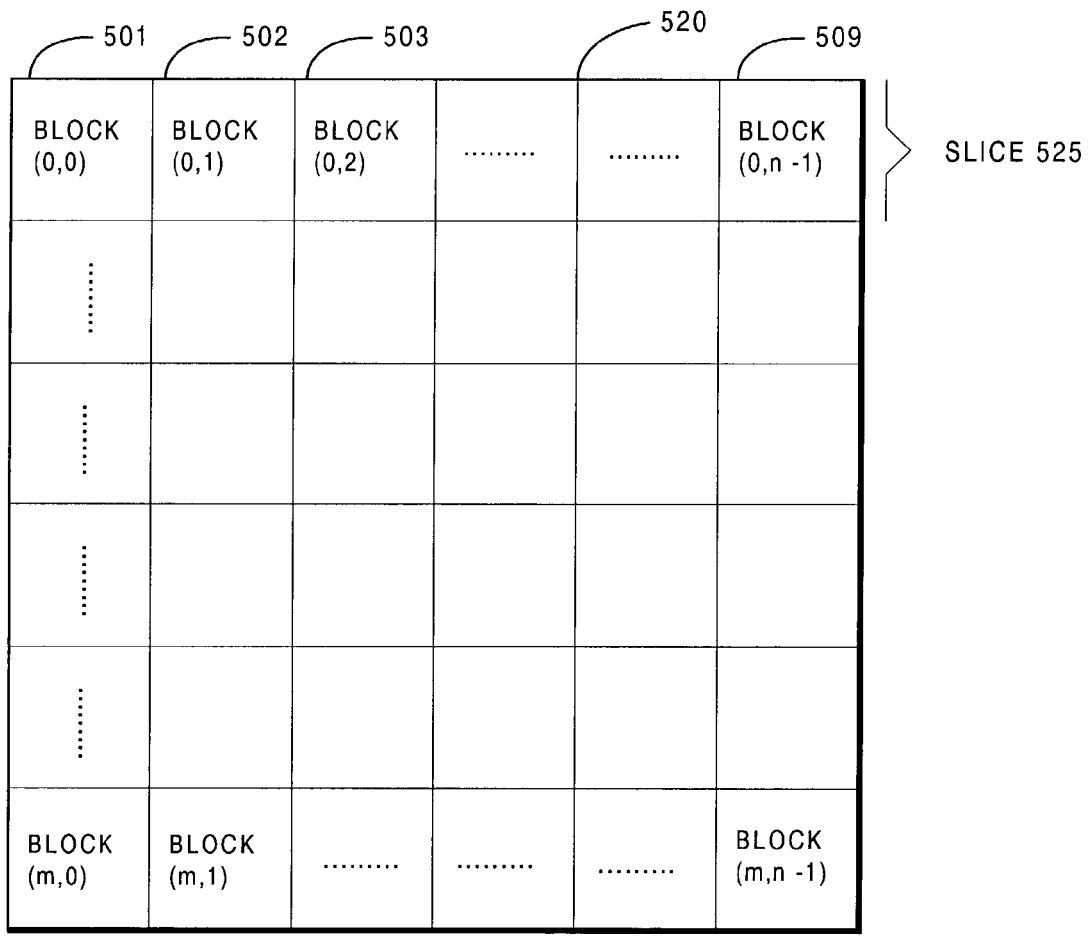
FIG. 5B is a representation of a JPEG image (or JPEG image data) for a picture captured by an imaging device (e.g. a digital camera).
Figure 5C:
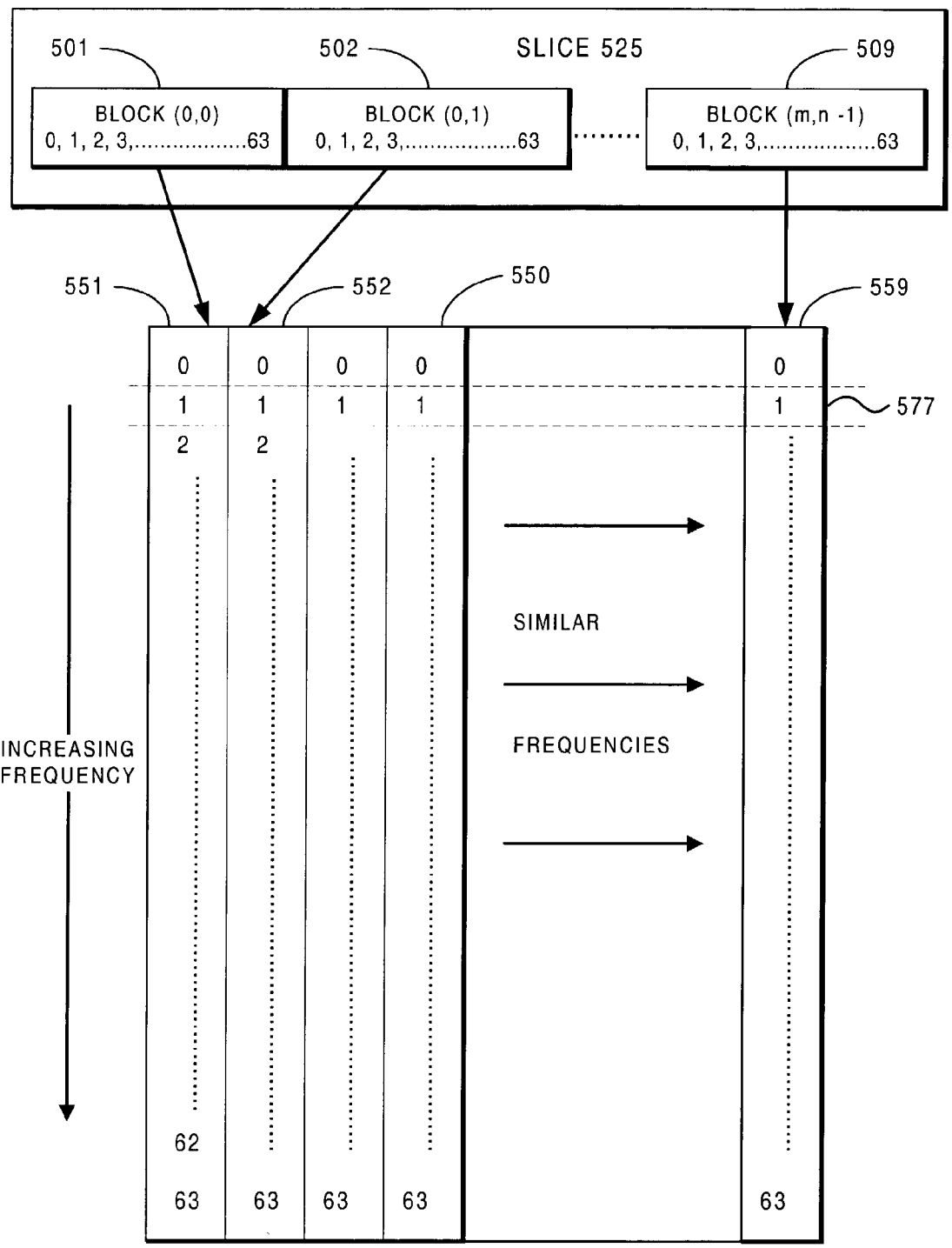
FIG. 5C illustrates the rearrangement of an exemplary slice of a JPEG image using the method of the present invention.

After entropy decoding of a JPEG image file, blocks of DCT coefficients are in a one-dimensional representation (or stream) of blocks, with each block containing 64 DCT coefficients ordered by frequency. FIGS. 5A–C illustrate the method of the present invention for rearranging the DOT coefficients generated by decoding a JPEG image. FIG. 5A is an example of the format of the stream of the decoded DCT coefficients resulting from the entropy decoding of a JPEG format image. The first block 501 (i.e., block (0,0)) typically represents the upper left corner of the image. As shown at FIG. 5A, the 64 coefficients in this block are in one dimension, ordered by frequency starting with frequency 0 (the DCT coefficient), then frequency 1, and so forth through frequency 63. The adjacent block 502 in the same row (i.e., block (0,1)) follows in the stream and is organized in a similar fashion. This proceeds through the end of the image data at block 549 (i.e., block (m, n)) as shown at FIG. 5A.

As previously described, the entropy-decoded coefficients are analyzed in slices, with each slice representing blocks of JPEG image data that are contiguous and correspond to eight lines in the original image. FIG. 5B is a representation of a JPEG image (or JPEG image data) 520 for a picture captured by an imaging device (e.g., a digital camera). As previously described, raw image data is broken into a number of 8×8 pixel boxes and a Discrete Cosine Transform is applied in generating the JPEG image 520. As shown at FIG. 5B, the slice 525 at the top of the JPEG image 520 at FIG. 5B comprises the first eight lines of pixels across the top of the image 520. Slice 525 begins with box or block 501, the first 8×8 pixel block at the top left of the image 520, which is also referred to as block (0,0). Next, slice 525 continues with the adjacent block 502 (also referred to as block (0,1)) to the right of block 501, then block 503, and so forth until the end of this row at block 509 (also referred to as block (0, n–1)).

The coefficients contained in the same position of each of the blocks shown at FIG. 5B, particularly those in contiguous blocks (e.g., blocks 502, 503), are often very similar to each other. For example, the first (or DCT) coefficient is likely to be similar from one block to the next. The highest frequencies in each block are also likely to be similar. Accordingly, the method of the present invention rearranges the coefficients by aggregating similar frequencies together so that these similarities may be exploited. FIG. 5C illustrates the rearrangement of an exemplary slice 525 of a JPEG image using the method of the present invention. As shown at the top of FIG. 5C, the slice 525 consists of the same line of blocks from block 501 through 509 (i.e., block (0, 0) through block (0, n–1)) as previously illustrated at FIG. 5B. There are 64 coefficients in each of the boxes (i.e., from 0 to 63) as previously described. The method of the present invention for rearranging these coefficients will now be described.

As shown at FIG. 5C, the 64 coefficients from block 501 (block (0,0)) are placed in the first column 551 of array 550 starting from lower frequency coefficients at the top (e.g., 0) and moving down to higher frequency coefficients (e.g., 63) at the bottom. Next, block 502 (block (0,1)) is placed in the adjacent column 552 in the same order. This continues in the same manner through block 509 (block (0, n–1)) which is placed in the last column 559. The result of this rearrangement process can be considered to be like a table with 64 rows. The array or table is organized with lower coefficients at the top and higher coefficients at the bottom. Effectively, this groups the blocks of coefficients into 64 groups or sub-bands corresponding to the 64 transform coefficients. In other words, the coefficients at the same location in each of the 8×8 pixel blocks are grouped together to form a sub-band. For example, all the DCT coefficients (0) form the DCT sub-band, the AC coefficients (1) form the AC (1)

sub-band, and so forth. As shown at FIG. 5C, an exemplary sub-band 577 consists of a row of AC coefficients from the same location (i.e., AC coefficient 1) from each of the pixel blocks. As only a limited number of frequencies are represented by these coefficients, this process of rearranging the coefficients means that similar frequencies are usually placed next to each other in the same row (i.e., the same sub-band). For example, the higher frequency coefficients (e.g. coefficient 63) are likely to be the same or very similar in each of the columns. This provides an extra dimension of similarities that may be exploited when the image information is recompressed. The transcoding process also serves to smooth the image data, thereby avoiding block artifacts that may otherwise result if the image data remained in 8×8 pixel blocks. Block artifacts are minimized because the coefficients from different blocks are coded together. Because global information about the image is used, local differences that cause block artifacts are smoothed. The process for wavelet-based transformation of these 64 sub-bands will now be described.

E. Wavelet-based Transformation of Transcoded JPEG Image Data

After JPEG image data has been decoded and rearranged, it may be transformed by a wavelet-based scheme, thereby enabling a smaller image file to be generated for transmission and/or storage. A number of different wavelet transform methods may be used. For example, a Daubechies 9-tap, 7-tap filter may be used for wavelet transformation or encoding of the image. In general, a wavelet-based transformation is similar to other types of transform-based coding schemes, including DCT which is used by JPEG. A wavelet-based transformation or encoding typically involves first applying a forward discrete wavelet transform on the source image data. The transform coefficients are then quantized and entropy coded before forming the output code stream (bitstream). In the case of the present example of recompression of the digital image, the forward discrete wavelet transform involves transforming or decomposing the sub-bands of coefficients received as input into multiple "bands" or levels. These multiple bands are then usually further quantized to enable compression into a smaller image file (for lossy re-compression). However, if a higher quality image was desired, these multiple bands may not be quantized, thereby enabling lossless re-compression of the image. After quantization, the bands are then coded using one or more entropy coding schemes such as those previously described for JPEG images.

In basic operation, the wavelet-based transformation consists of processing the image as a whole in a stepwise, linear fashion. The wavelet transform process or technique may be thought of as a process that applies a transform (i.e., a forward discrete wavelet transform), often as a sequence of high- and low-pass filters. Typically, the transformation of raw image data is applied by stepping through individual image pixels and applying the transform. Applying a two-dimensional sequence of high- and low-pass filters in this manner creates an image that contains four quadrants, which may for instance be performed as follows. First, a high-pass transform then a low-pass transform is performed in the horizontal direction. This is followed by a high-pass transform then a low-pass transform performed in the vertical direction. The upper-left quadrant is derived from a low-pass horizontal/low-pass vertical image; the lower-left quadrant comprises a high-pass horizontal/low-pass vertical image; the upper-right quadrant comprises a low-pass horizontal/high-pass vertical image; and the lower-right quadrant comprises a high-pass horizontal/high-pass vertical image. The result of this transformation is that the information most important to the human eye (i.e., the information, that from a luminosity or black and white perspective, the human eye is most sensitive to) is in the high-priority "low/low" quadrant, that is, the upper-left quadrant which contains the low-pass horizontal/low-pass vertical image. These quadrants or sub-sampled portions are also referred to as "bands", in the image processing literature.

Figure 6:
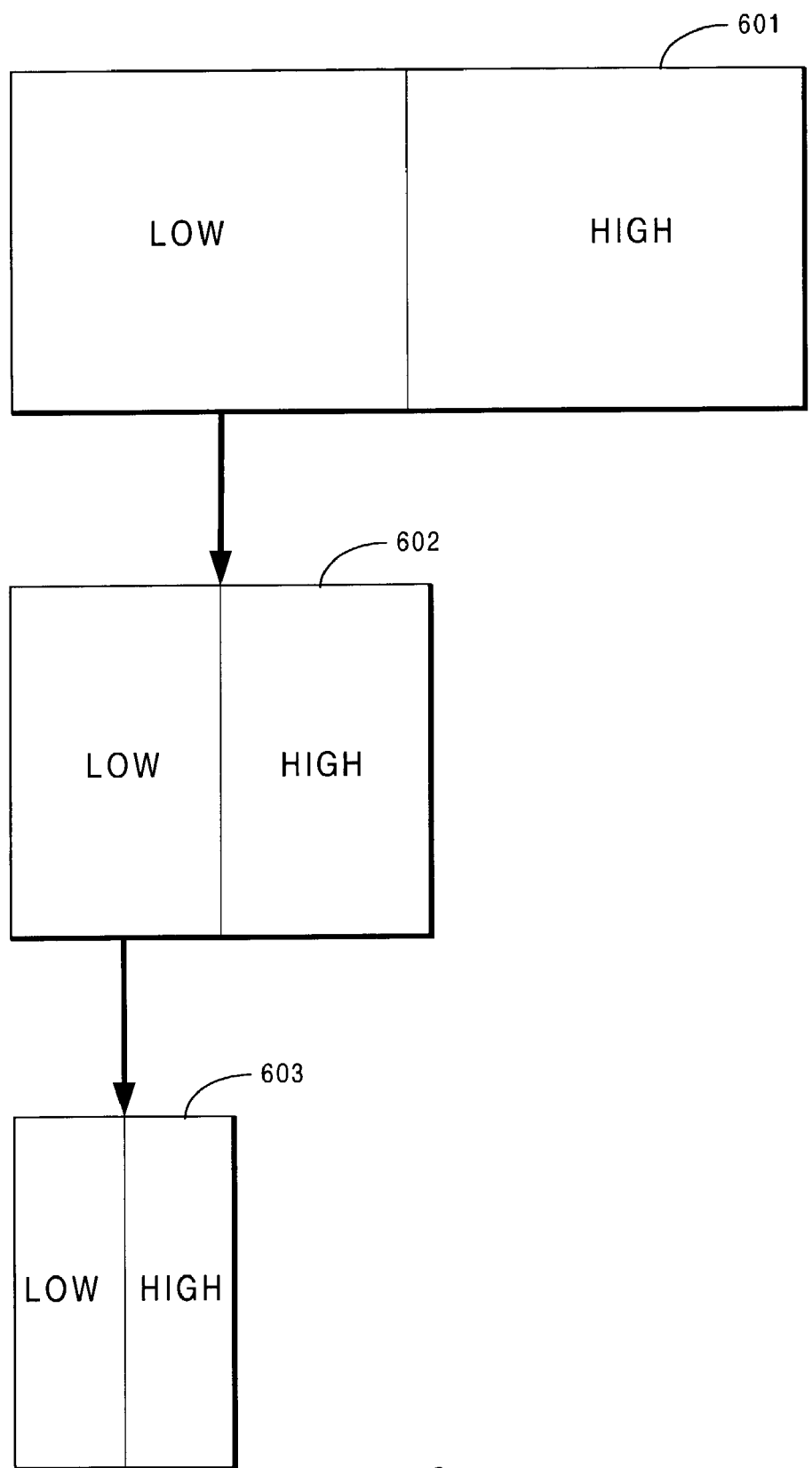
FIG. 6 illustrates the application of a one-dimensional wavelet-based horizontal filter to the decoded and re-arranged DCT coefficients.

In the currently preferred embodiment of the present invention, a one-dimensional transformation is applied for transformation of the decoded and rearranged DCT coefficients to attempt to exploit similarities resulting from rearrangement of the image data as previously described. In this one-dimensional transformation, the image data is broken into multiple levels or sub-sampled portions through a wavelet decomposition or filtering. FIG. 6 illustrates the application of a one-dimensional wavelet-based horizontal filter to the decoded and rearranged DCT coefficients. As shown, the first application of the filter is illustrated at block 601. With each iteration, the higher level frequencies are eliminated and the lower level frequencies are retained. As shown at FIG. 6, this one-dimensional filtering process is typically repeated multiple times (e.g., at blocks 602, 603), based upon the amount of compression that is desired. When repeated, the process is repeated for the low frequency portion of the then-current image (i.e., the prior result of one-dimensional filtering) as shown at block 602, again retaining the lower frequency portion. In other words, the low frequency half of the then-current image is again split and this lower-frequency half of this half is again transformed as shown at FIG. 6. Those skilled in the art will recognize that a two-dimensional transformation may also be applied (e.g., using high-pass and low-pass filters to create four quadrants or bands instead of two) as well. For further description of wavelet-based compression of images, see e.g., Pigeon, S., "Image Compression with Wavelets," Dr. Dobb's Journal, August 1999, pp. 111–115, the disclosure of which is hereby incorporated by reference. Also see e.g., Xiong, Z. and Ramchandran, K., "Wavelet Image Compression," Jun. 12, 2000, the disclosure of which is also hereby incorporated by reference.

The filtering operations can be continued recursively, further decomposing the low-frequency portion (i.e., the lower frequency or left half as shown at FIG. 6), and repeated for as many levels of decomposition as desired. If a one-dimensional transformation is applied in the manner described above, the result of this is that the information most important to the human eye (i.e., the information, that from a luminosity or black/white perspective, the human eye is most sensitive to) is in the high-priority "low frequency" portion of the then-current image, that is, the left half which contains the lower frequency coefficients. Much of the information in the other portion (i.e., the right half) is either zero or represents higher frequency information that is least visible to the human eye. Thus, the lower frequency information portion is retained while higher frequency information which is of much lower priority is discarded. The end result is a wavelet-transformed image, which may then be readily compressed (e.g., using entropy coding schemes like run-length encoding and Huffman coding). The wavelet-transformed and compressed image also has the advantage of being smoother than a standard JPEG image which is similarly compressed (as such JPEG images tend to be blocky), and are more natural and pleasing to the human eye.

In addition to compressing the image, the image data may also be sub-sampled, as desired, prior to transmission or storage. For example, a JPEG image stored in flash memory may comprise 1024×1024 pixels of image data. Prior to wireless transmission, this may be reduced to a 512×1024 image to enable more efficient transmission. A similar result of further compressing the size of an image may also be achieved using the methodology of the present invention by sub-sampling or down-sampling the decoded DCT coefficients prior to application of the wavelet-based transformation. For instance, instead of retaining all 64 coefficients in each block (i.e., coefficients from zero to 63), only 32 or 16 of the lower frequency coefficients may be retained and input into the wavelet-based transformation process. This sub-sampling or down-sampling of the image data enables compression of the image into a smaller format for storage or transmission, if desired. The specific method steps involved in the transformation and recompression of a JPEG image file in accordance with the present invention will now be described.

F. Transcoding and Improved Compression of JPEG Images

Figure 7:
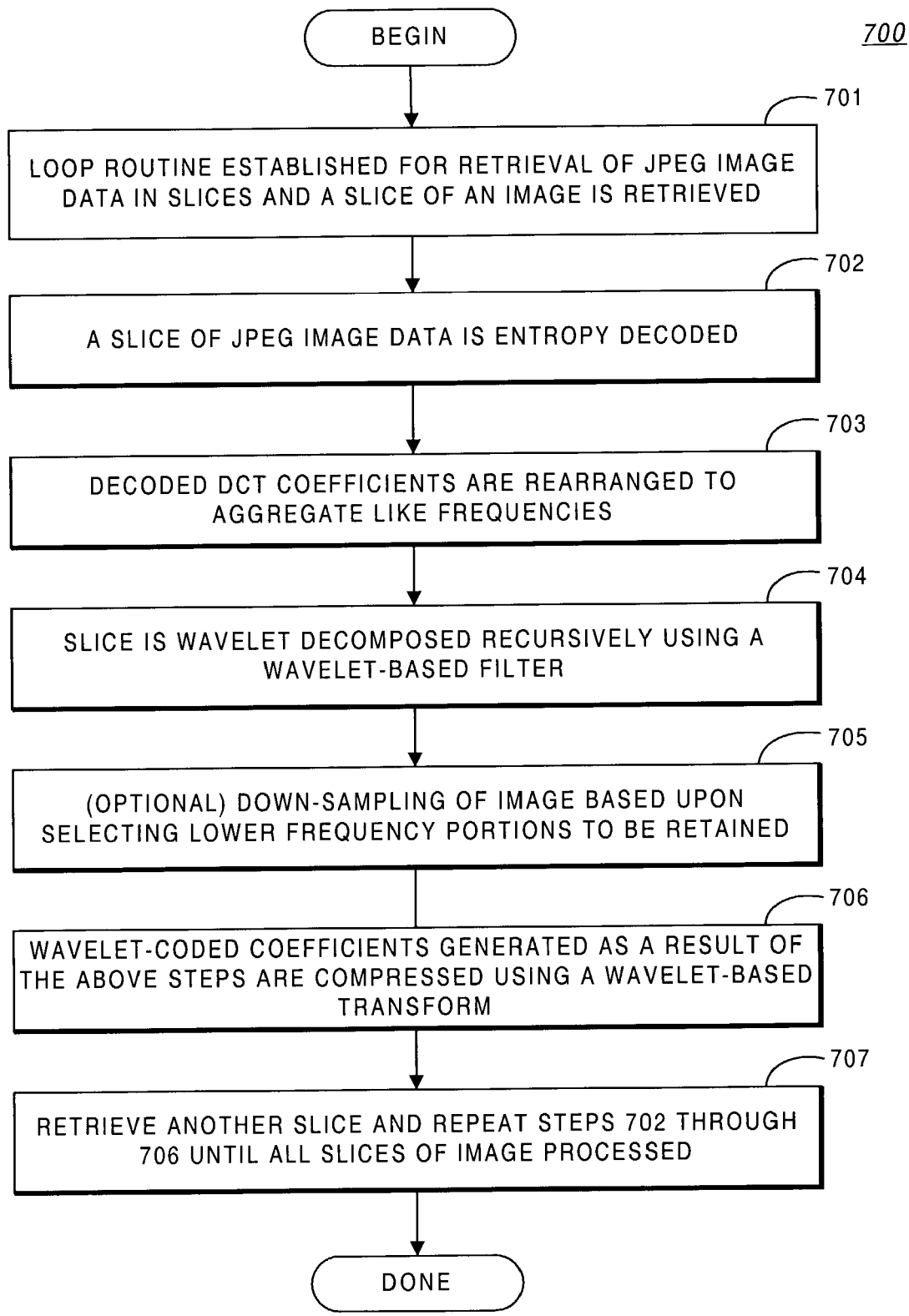
FIG. 7 is a flow chart illustrating the detailed method steps of the operation of the present invention in transcoding a JPEG image and re-compressing the image using wavelet-based compression methods.

FIG. 7 is a flow chart illustrating the detailed method steps of the operation of the present invention in transcoding or transforming a JPEG image and re-compressing the image using wavelet-based compression methods. The method steps described below may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

The method begins at step 701 with the receipt of a JPEG compressed image file for a particular image (e.g. a JPEG image retrieved from flash memory on a digital camera). As previously described and illustrated at FIG. 5A, the JPEG compressed image consists of 8×8 pixel blocks, with each block containing 64 coefficients from zero (0) to 63. In the currently preferred embodiment, a loop routine is established to retrieve a slice of contiguous blocks of image data. Recall that a slice is a row of contiguous blocks corresponding to eight lines on an original image as previously shown at FIG. 5B. Each slice of the JPEG image is typically retrieved from flash memory as a stream of blocks, with each block containing coefficients ordered sequentially (e.g., from zero to 63 in the first block, then from zero to 63 in the second block, and so on).

At step 702, this slice of JPEG image data is entropy decoded. For example, assume that the JPEG image was entropy encoded using a run-length encoding and a Huffman encoding as previously described. This exemplary slice of blocks that is retrieved is entropy decoded by performing a Huffman decoding and a run-length decoding. A slice of blocks of decoded DCT coefficients are generated a result. This slice can, in effect, be viewed as a one-dimensional array of coefficients beginning with the first (or DCT) coefficient from the first 8×8 block in the slice, through the last coefficient (coefficient 63) at the end of the last block of the row. In the currently preferred embodiment, the JPEG image data is transformed in slices to more efficiently use available system resources. Although the same method could be used for an entire image (or a larger portion of an image), additional memory would be required to handle the transformation and re-compression of this larger quantity of image data.

After decoding, at step 703, the slice of decoded DCT coefficients is rearranged to aggregate like frequencies together. As previously described and illustrated at FIG. 5C, this involves grouping the coefficients at the same location in each of the 8×8 pixel blocks together to form a sub-band. A sub-band consists of a row of AC coefficients from the same location (i.e., AC coefficient 1 as shown in row 577 at FIG. 5C) from each of the pixel blocks. This process of rearranging the coefficients means that like frequencies are usually aggregated into the same sub-band. The resulting rearranged coefficients can be considered as being rearranged in a table consisting of 64 rows (from lowest frequency at the top to highest frequency at the bottom), with similar frequencies located next to each other in each row (e.g., row 577 as shown at FIG. 5C).

After a slice of image data has been rearranged, at step 704, the slice is transformed or decomposed using a wavelet-based decomposition (i.e., a forward discrete wavelet transform). In the currently preferred embodiment, a one-dimensional transform is applied recursively to decompose the slice along the horizontal direction. This one-dimensional wavelet-based decomposition is typically repeated multiple times by taking the low frequency portion of the then-current image (i.e., the prior sub-sampled portion resulting from one-dimensional filtering), applying the filter again to this low frequency portion, and again retaining the lower frequency portion resulting from this recursive application of the filter as illustrated at FIG. 6.

After a slice of image data has been decomposed using a wavelet-based transform, at optional step 705 the slice may be sub-sampled for transmission if desired. For example, if desired a 1024×1024 image may be reduced to a 512×1024 image to enable more efficient transmission of the image. This enables the transmission of a smaller file when necessary, such as for transmission over a wireless network having limited bandwidth.

At step 706, the wavelet-coded coefficients which are generated as a result of the above steps are compressed for transmission or storage. In the currently preferred embodiment, this includes quantization and entropy encoding using both a run-length encoding and Huffman coding as previously described. The re-compressed image information from this slice may then be transmitted (e.g., via wireless transmission) or stored, as desired. The method of the present invention also enables transmission of the re-compressed image information in slices, if desired. While other slices of an image are still being transformed, one or re-compressed slices may be streamed out (i.e., transmitted), thereby expediting the process of sending the image wirelessly.

After a particular slice of image data has been transcoded and re-compressed as described above, at step 707 the next slice of image data is retrieved. This typically includes clearing the transformed slice from the working memory (i.e., freeing RAM) and retrieving another slice of JPEG image data for transcoding and re-compression. At this point steps 702 through 706 may be repeated for other slices of the image. These steps are typically repeated a number of times until all slices (or blocks) of the image data have been processed. When the entire image has been transcoded and re-compressed, the method terminates.

The method of the present invention is particularly useful for transmission of an image over a network having limited bandwidth; such as transmission of an image from a digital camera over a wireless network to a remote sever. A primary advantage is the improved compression that may be achieved using the foregoing transcoding and re-compression using wavelet-based methods. The transmission of the image in slices also enables transformation and re-compression of the image on the fly as the process of transforming and transmitting the image information can be performed in parallel.

After a re-compressed image has been transmitted to a remote server, the image may be reconverted to JPEG format if desired. This simply involves the reverse of the above steps. The compressed image (or a portion thereof) is entropy decoded on the server. Following entropy decoding, the image may be wavelet decoded. After wavelet decoding, the image may be converted to JPEG format for storage. In this context, there is usually some loss of image fidelity as quantization and down sampling is typically employed at the digital camera in order to enable better compression of the image given the current bandwidth limitations of wireless networks. Given these current bandwidth constraints, the method of the present invention enables transmission of a better quality image at high compression step sizes. In particular, the method of the present invention reduces or avoids the block artifacts that would result if a JPEG compression was used to generate a similar size image (i.e., an image file compressed to the same degree for transmission or storage).

While the invention is described in some detail with specific reference to a single-preferred embodiment and certain alternatives, there is no intent to limit the invention to that particular embodiment or those specific alternatives. For instance, while the foregoing discussion refers to an image compressed using the JPEG compression scheme, the system and methodology of the present invention may also be used with other compression schemes employing a Discrete Cosine Transform (DCT). Those skilled in the art will appreciate that modifications may be made to the preferred embodiment without departing from the teachings of the present invention.

What is claimed is:

1. A method for transformation and improved compression of a digital image having been compressed using Discrete Cosine Transform (DCT) based compression, the method comprising:
receiving a digital image, said digital image having been compressed using Discrete Cosine Transform (DCT) based compression to generate a plurality of DCT coefficients of the image;
aggregating a first DCT coefficient from a first pixel block of the partially decompressed image with a second DCT coefficient from a second pixel block adjoining the first pixel block of the partially decompressed image based on similarity of frequencies of the first DCT coefficient and the second DCT coefficient;
partially decompressing said digital image; and
recompressing said digital image using wavelet-based compression, wherein the recompressing comprises quantizing the image and entropy coding the image.

2. The method of claim 1, wherein said Discrete Cosine Transform (DCT) based compression includes Joint Photographic Experts Group (JPEG) compression.

3. The method of claim 1, wherein said step of partially decompressing said digital image includes entropy decoding said digital image.

4. The method of claim 3, wherein said step of entropy decoding includes a variable length decoding.

5. The method of claim 3, wherein said step of entropy decoding includes a run length decoding.

6. The method of claim 1 wherein said step of partially decompressing said image includes partially decompressing said image in segments.

7. The method of claim 1, further comprising:
rearranging said partially decompressed digital image to aggregate like frequencies together before recompressing said digital image.

8. The method of claim 7, wherein said step of aggregating like frequencies includes aggregating Discrete Cosine Transform (DCT) coefficients of said digital image into at least eight sub-bands.

9. The method of claim 1, wherein said step of recompressing said digital image includes transforming said digital image using a forward wavelet-based transform.

10. The method of claim 1, wherein said step of recompressing said digital image includes using a one-dimensional wavelet-based transform.

11. The method of claim 1, wherein said step of recompressing said digital image includes using a two-dimensional wavelet-based transform.

12. The method of claim 1, wherein said step of recompressing said digital image includes recompressing said image in segments.

13. The method of claim 12, wherein each said segment corresponds to a row of eight lines of pixels of said digital image.

14. The method of claim 12, wherein said step of recompressing said image in segments includes the substeps of:
rearranging each said segment to aggregate like frequencies together; and
compressing each said segment using a wavelet-based compression.

15. The method of claim 1, wherein said step of receiving a digital image includes retrieving said digital image from memory of a digital imaging device.

16. The method of claim 1, wherein said steps of partially decompressing and recompressing said digital image are performed on a digital imaging device.

17. The method of claim 1, further comprising:
transmitting said recompressed digital image from a digital imaging device to a second device.

18. The method of claim 17 wherein said set of transmitting said recompressed digital image includes transmitting said recompressed digital image in segments.

19. The method of claim 17, further comprising:
decompressing said recompressed digital image on said second device.

20. The method of claim 17, further comprising:
decompressing said recompressed digital image on said second device and recompressing said digital image using Joint Photographic Experts Group (JPEG) compression.

21. A computer-readable medium having computer-executable instructions for performing the method of claim 1.

22. A downloadable set of computer-executable instructions for performing the method of claim 1.

23. A method for transformation and improved compression of an image that has been compressed using Joint Photographic Experts Group (JPEG) compression, the method comprising:

upon receiving a JPEG compressed image, partially decompressing the image to generate Discrete Cosine Transform (DCT) coefficients of the image;
rearranging said DCT coefficients of the image to aggregate a first DCT coefficient from a first pixel block of the partially decompressed image with a second DCT coefficient from a second pixel block adjoining the first pixel block of the partially decompressed image based on similarity of frequencies of the first DCT coefficient and the second DCT coefficient; and
recompressing said digital image using wavelet-based compression.

24. The method of claim 23, wherein said receiving step includes retrieving said digital image from memory of a digital camera.

25. The method of claim 23, wherein said transformation and improved compression of an image is performed on a digital camera.

26. The method of claim 23, wherein said JPEG compressed image includes an image compressed using JPEG compression and stored in JPEG File Interchange Format (JFIF).

27. The method of claim 23, wherein said JPEG compressed image includes an image compressed using JPEG compression and stored in any file format.

28. The method of claim 23, wherein JPEG compressed image includes an image compressed using a Discrete Cosine Transform (DCT) based compression method.

29. The method of claim 23, wherein said partially decompressing step includes entropy decoding.

30. The method of claim 29, wherein entropy decoding includes a run length decoding.

31. The method of claim 29, wherein entropy decoding includes a variable length decoding.

32. The method of claim 23, wherein said recompressing step includes recompressing the image in segments.

33. The method of claim 23, wherein said rearranging step includes rearranging the image in segments.

34. The method of claim 23, further comprising:
transmitting the recompressed image from a digital camera to a second device.

35. The method of claim 34, wherein said transmitting step includes transmitting the image in segments.

36. The method of claim 34, further comprising:
sub-sampling the image before transmission to the second device to reduce the size of the image file.

37. The method of claim 23, wherein said recompressing step includes using a one-dimensional wavelet-based transform.

38. The method of claim 23, wherein said recompressing step includes using a two-dimensional wavelet-based transform.

39. The method of claim 23, wherein said recompressing includes coding the image using a wavelet-based transform.

* * * * *